United States Patent Office 3,344,077
Patented Sept. 26, 1967

3,344,077
ORGANIC PHOSPHORUS COMPOUNDS
Riyad R. Irani, St. Louis, and Kurt Moedritzer, Webster Groves, Mo., assignors to Monsanto Company, St. Louis, Mo., a corporation of Delaware
No Drawing. Filed Aug. 27, 1965, Ser. No. 483,339
13 Claims. (Cl. 252—137)

This invention relates to organic compounds of phosphorus.

This application is a continuation-in-part of applications Ser. No. 152,048, filed Nov. 13, 1961; Ser. No. 217,276, filed Aug. 16, 1962, and Ser. No. 241,562, filed Dec. 3, 1962.

An object of this invention is to provide new and useful organic compounds of phosphorous containing a

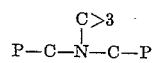

linkage in their molecules.

A further object of this invention is to provide new and useful organic compounds of phosphorus containing a

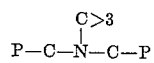

linkage in their molecules with the C>3 group being a hydrophobic and/or lipophilic group.

A further object of this invention is to provide new and useful organophosphonic acids, as well as their salts and esters.

A more specific object of this invention is to provide new and useful organo-amino-di-alkylene phosphonic acids or the salts thereof which exhibit, among other things, combined surfactancy and deflocculating properties.

A more specific object of this invention is to provide new and useful organo-amino-di-alkylene phosphonate esters which exhibit, among other things, the unique ability of solubilizing water in water-immiscible solvents.

Other objects of this invention will appear from the description hereinafter.

This invention is directed to new and useful organo-amino-di-alkylenephosphonic acid compounds, as well as the salts and esters thereof, said compounds having the general formula

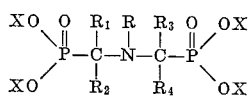

wherein:

R is selected from the class consisting of aliphatic hydrocarbyl, alicyclic, aryl, alkaryl and aralkyl groups of from 4 to 30 carbon atoms; $R_1$, $R_2$, $R_3$ and $R_4$ are selected from the class consisting of hydrogen, aliphatic hydrocarbyl, alicyclic, aryl, alkaryl and aralkyl groups of from 1 to 30 carbon atoms; and X is selected from the class consisting af cations, alkyl groups of from 1 to 30 carbon atoms, aryl groups, and alkaryl groups. By the term "cations" is meant hydrogen ions, alkali metal cations, alkaline earth metal cations, ammonium ions, or amine ions. For the above-mentioned groups which represent R, $R_1$, $R_2$, $R_3$, $R_4$ and X when it represents alkyl, aryl and alkaryl groups, the OH, COOH, $OCH_3$, halogen, $NO_2$ and $SO_3$ substituted derivatives of the groups are intended to be also included within their meaning. However, for most end use applications the compounds of the instant invention should preferably contain not more than 25 carbon atoms associated with R, $R_1$, $R_2$, $R_3$, $R_4$ and X when it represents alkyl, aryl, and aralkyl groups, and there are few, if any, end uses, in which the foregoing groups contain more than a total of 50 carbon atoms.

These compounds can be characterized quite generally as having a P—C—N—C—P linkage in their molecules and are generically described in this specification by the general terms organo-amino-di-alkylene-phosphonic acids, the salts of organo-amino-di-alkylenephosphonic acids, and the esters of organo-amino-di-alkylenephosphonic acid.

The compounds of the invention can be prepared by various methods with the following methods presented as being representative for their preparation.

The organo-amino-di-alkylenephosphonic acids can be prepared by the reaction of primary amines, a compound containing a carbonyl group, such as an aldehyde or ketone, and orthophosphorous acid. Generally, by heating the mixture above 50° C. at a low pH, preferably around pH 2 or below, the extent of the reaction is usually completed in one to three hours. Another method is the hydrolysis of the ester, i.e., tetra-alkyl organo-amino-di-alkylenephosphonate, with concentrated HCl or HBr. Generally by refluxing the ester and acid at reflux temperature for a period usually at least about three hours is all that is required for the hydrolysis. In the foregoing reactions molar ratios should be used in the proportions which will form the desired P—C—N—C—P molecular linkage.

The salts of organo-amino-di-alkylene phosphonic acids can be prepared by neutralization of the acids with a stoichiometric amount of a base that contains essentially the desired cation. Bases such as those containing an alkali metal, alkaline earth, ammonia and amines are especially suited. In particular, amine salts prepared from low molecular weight amines, i.e., having a molecular weight below about 300, and more particularly the alkyl amines, alkylene amines and alkanol amines containing not more than 2 amine groups, such as, ethyl amine, diethyl amine, propylamine, propylene diamine, hexylamine, 2-ethyl hexyl amine, N-butylethanol amine, ethanol amine, triethanol amine and the like, are the preferred amine salts. For example, to make a sodium salt, one of the organo-amino-di-alkylene phosphonic acids can be neutralized with a stoichiometric amount of a base containing the sodium cation, such as NaOH, $Na_2CO_3$ and the like.

The esters of organo-amino-di-alkylene phosphonic acids can be prepared directly by the reaction of primary amines, a compound containing a carbonyl group, such as an aldehyde or ketone, and a dialkyl phosphonate. Generally by heating the mixture above 50° C. the extent of the reaction is usually completed in about one to three hours. In some cases it is advantageous to form a reaction product of an aldimine or ketimine with a dialkyl phosphonate and still further react the product with a mixture of an aldehyde or ketone and dialkyl phosphonate. This method can result in forming a C-substituted P—C—N—C—P molecular linkage. It should be noted that here also it is necessary to use the correct molar ratios in order to obtain satisfactory yields with the desired P—C—N—C—P molecular linkage.

For the foregoing methods of preparation reaction conditions such as temperature, pH, and time for reaction can be varied with the optimum conditions for the reactions readily ascertained by those skilled in the art. Reference to the specific examples presented hereinafter may be of aid in order to further assist in teaching the methods of their preparation.

The following examples are presented to illustrate the invention, with parts by weight being used in the examples unless indicated otherwise.

*Example I*

Into a conventional jacketed, glass-lined mixing vessel fitted with a water condenser are charged 164 parts of orthophosphorous acid, 102 parts of n-hexylamine, and 50 parts of water. The resulting mixture is stirred continuously through the remainder of the process described below. The mixture is heated to 95° C., and maintained at about 95° C., while, over a period of about 20 minutes, 66 parts (10% excess) of paraformaldehyde are added slowly thereinto. Then, for an additional hour after all of the formaldehyde has been added, the resulting mixture is refluxed at a temperature of about 110° C. after which time the reaction mixture is cooled to room temperature. By nuclear magnetic resonance measurements, it is found that more than 90% of the orthophosphorous acid has been converted to the desired product, hexylaminodi(methylphosphonic acid), $$C_6H_{13}N(CH_2PO(OH)_2)_2$$

The equivalent weight of this product, by titration, is found to be about 96.1, which compares excellently with the calculated value of about 96.3.

Example II

Into a mixing vessel similar to that described in Example I, above, are charged 134 parts of cyclohexylamine hydrochloride, 164 parts of orthophosphorous acid and 25 parts of water. The resulting mixture is blended together and heated to 100° C. Then, over a period of about 30 minutes, 66 parts (10% excess) of paraformaldehyde are added slowly thereinto. Then for an additional hour after all of the formaldehyde has been added the resulting mixture is refluxed at a temperature of about 110° C. after which the reaction mixture is cooled to room temperature. By nuclear magnetic resonance measurements, it is found that more than 90% of the orthophosphorous acid has been converted to the desired product, cyclohexylaminodi(methylphosphonic acid), $C_6H_{11}N(CH_2PO(OH)_2)_2$. The equivalent weight of this product, by titration, is found to be about 96.6, which compares excellently with the calculated value of about 95.7.

Example III

Into a mixing vessel such as that described in Example I, above, are charged 164 parts of orthophosphorous acid, 213 parts of n-tetradecylamine, and 50 parts of water. The resulting mixture is stirred continuously through the remainder of the process described below. The mixture is heated to 95° C., and maintained at about 95° C. while, over a period of about 20 minutes, 66 parts (10% excess) of paraformaldehyde are added slowly thereinto. Then for an additional hour after all the formaldehyde has been added, the resulting mixture is refluxed at a temperature of about 110° C. after which the reaction mixture is cooled to room temperature. By nuclear magnetic resonance measurements, it is found that more than 90% of the orthophosphorous acid has been converted to the desired product, n-tetradecylaminodi(methylphosphonic acid), $C_{14}H_{29}N(CH_2PO(OH)_2)_2$. The equivalent weight of this product, by titration, is found to be about 137, which compares excellently with the calculated value of about 134.

Example IV

Trisodium n-tetradecylaminodi(methylphosphonate), $C_{14}H_{29}N[CH_2PO(ONa)_2][CH_2PO(ONa)(OH)]$, is prepared by dissolving 20 grams of free acid obtained in Example III in about 50 ml. of 10% NaOH solution and evaporating the aqueous solution to dryness at about 140° C. with the anhydrous form of the salt being formed.

Example V

Into a mixing vessel similar to that described in Example I above, are charged 164 parts of orthophosphorous acid, 266 parts of oleylamine, and 50 parts of water. The resulting mixture is stirred continuously through the remainder of the process described below. The mixture is heated to 95° C., and maintained at about 95° C. while, over a period of about 20 minutes, 66 parts (10% excess) of paraformaldehyde are added slowly thereinto. Then for an additional hour after all formaldehyde has been added, the resulting mixture is refluxed at a temperature of about 110° C. after which the reaction mixture is cooled to room temperature. By nuclear magnetic resonance measurements, it is found that more than 90% of the orthophosphorous acid has been converted to the desired product, oleylaminodi(methylphosphonic acid), $n-C_{18}H_{35}N(CH_2PO(OH)_2)_2$. The equivalent weight of this product, by titration, is found to be about 158.2, which compares excellently with the calculated value of about 152.5.

Example VI

Into a mixing vessel similar to that described in Example I, above, are charged 134 parts of cyclohexylamine hydrochloride, 164 parts of orthophosphorous acid, and 25 parts of water. The resulting mixture is blended together and heated to 100° C. Then, over a period of about 30 minutes, 215 parts of benzaldehyde are slowly poured into the hot mixture. The temperature of the reaction mixture is maintained at about 100° C. for 2 hours, and then cooled to room temperature. Nuclear magnetic resonance analysis of the resulting product indicates that practically all of the orthophosphorous acid has been reacted to form the desired stable $$P—C—N—C—P$$

linkage. The equivalent weight of the resulting product, cyclohexyl aminodi(benzylidenephosphonic acid), $$C_6H_{11}N(CH(C_6H_5)PO(OH)_2)_2$$

is 114 (theory=109).

Example VII

Into a mixing vessel similar to that described in Example I, above, are charged 164 parts of orthophosphorous acid, 108 parts of benzylamine and 75.6 parts of concentrated HCl. The resulting mixture is stirred and heated at 90–100° C. while 120 parts of 37% aqueous formaldehyde solution (100% excess) are added in the course of 30–60 minutes. The solution is then kept at 90–100° C. for about 2 to 3 hours. On cooling to room temperature benzylaminodi(methylphosphonic acid), $C_6H_5CH_2N(CH_2PO(OH)_2)_2$, precipitates with a yield of 85.7%. The equivalent weight of this product, by titration, is found to be about 102 which compares with the calculated value of about 98.4.

Example VIII

Into a conventional mixing vessel fitted with a reflux condenser are blended 119 parts of α-hydroxy-decylphosphonic acid and 58 parts of decylamine. The mixture is heated at about 110° C. for about 3 hours. The resulting product, decylaminodi(nonylmethylphosphonic acid), $C_{10}H_{21}N[CH(C_9H_{19})PO(OH)_2]_2$, precipitated in the form of its tri(decylammonium) salt upon cooling. The free acid is generated by prolonged grinding of the product in 5 N HCl followed by dilution of boiling water.

Example IX

Into a conventional 3-necked, 3-liter flask fitted with a reflux condenser, stirrer and thermometer are charged 102 parts of n-hexylamine, 246 parts of diethyl phosphonate and 180 parts of paraformaldehyde. Upon heating to 70° C. a vigorous reaction is initiated forming the product tetraethyl hexylaminodi(methylphosphonate), $C_6H_{13}N(CH_2PO(OC_2H_5)_2)_2$. The NMR spectrum of the product indicates almost complete conversion (≥98%) of the originally present diethylphosphonate to the tetraethyl hexylaminodi(methylphosphonate) by exhibiting a single NMR. peak at −24.9 p.p.m.

Example X

Into a conventional 3-necked, 3-liter flask fitted with a reflux condenser, stirrer and thermometer were charged 426 parts of tetradecylamine, 485 parts of diethyl phosphonate and 325 parts of 36% aqueous formaldehyde solution. The mixture is heated to about 70° C. at which temperature the reaction becomes exothermic with the temperature rising to about 120° C. The flask is allowed to cool to room temperature and the reaction product extracted with benzene. The solvent was separated from the oily product by distillation. This product, tetraethyl tetradecylaminodi(methylphosphonate)

$$C_{14}H_{29}N(CH_2P(O)_3C_2H_5)_2$$

had a NMR. chemical shift of $-24.9$ p.p.m. The single NMR. peak of the product indicates the presence of only one type of phosphorus compound, i.e., tetraethyl tetradecyl aminodi(methylphosphonate).

Example XI

A ketimine is prepared from 182 parts of n-hexylamine and 105 parts of acetone by reacting the acetone with the primary amine in the presence of anhydrous potassium carbonate, separating the ketimine from the aqueous layer and drying thoroughly over potassium hydroxide. This procedure resulted in 231 parts of the ketimine.

Into a reaction vessel similar to that described in Example X are charged the 231 parts of the ketimine and 226 parts of diethyl phosphonate. The mixture is heated to 50° C. at which temperature the reaction is initiated as indicated by the rise in temperature to about 120° C. After cooling to room temperature the resulting product is treated with 50 parts of paraformaldehyde and 225 parts of diethyl phosphonate. This mixture is heated under stirring to about 90° C. at which temperature a vigorous reaction takes place as indicated by the dissolution of the solid paraformaldehyde and an increase of the temperature to 110° C. The resulting product is tetraethyl n-hexyl amino(isopropylidene phosphonate)(methyl phosphonate)

$$C_5H_{13}N[C(CH_3)2PO(OC_2H_5)_2][CH_2PO(OC_2H_5)_2]$$

Example XII

An imine is prepared by reacting 144 parts of butyraldehyde with 214 parts of benzylamine in the presence of anhydrous potassium carbonate, separating the imine product from the aqueous layer and drying over potassium hydroxide. This procedure resulted in a quantity of 308 parts of the imine.

Into a reaction vessel similar to that described in Example X are charged 260 parts of diethyl phosphonate and the 308 parts of imine. The mixture is heated to about 50° C. to initiate the reaction. After cooling to room temperature the resulting product is further reacted with 60 parts of paraformaldehyde and 260 parts of diethyl phosphonate by heating to about 90° C. under stirring, at which temperature a vigorous reaction occurs with the desired product, tetraethyl benzylamino(butylidene phosphonate)(methyl phosphonate)

$$C_6H_5CH_2N[CH(C_3H_7)PO(OC_2H_5)_2][CH_2PO(OC_2H_5)_2]$$

being formed.

Compounds representative of the instant invention which can be prepared by methods such as those described in the foregoing examples are:

(1) Long chain aliphatic hydrocarbyl-amino-di-alkylene phosphorus compounds, such as $C_4H_9N(CH_2P(O)(OH)_2)_2$ n-butyl-amino-di(methyl phosphonic acid)
$C_{10}H_{21}N(CH_2PO(OC_2H_5)_2)_2$ tetraethyl-decyl-amino-di(methyl phosphonate)
$C_{15}H_{31}N[CH_2PO(ONa)(OH)][CH_2PO(ONa)_2]$ trisodium-pentadecyl-amino-di(methyl phosphonate)
$C_5H_7N(CH_2PO(OH)_2)_2$ 3,5-pentadiene-amino-di(methyl phosphonic acid)
$C_5H_9N(CH_2PO(OH)_2)_2$ 5-hexyne-amino-di(methyl phosphonic acid)
$C_{19}H_{15}(CH_2PO(OC_2H_5)_2)_2$ tetraethyl-8-nonyne amino-di(methyl phosphonate)
$C_{12}H_{21}N(CH_2PO(OH)_2)_2$ 11-dodecene-amino-di(methyl phosphonic acid)
$(HOOC)C_3H_6N(CH_2PO(OH)_2)_2$ 3-carboxy-propyl-amino-di(methyl phosphonic acid)
$OHC_{12}H_{24}N(CH_2PO(OC_2H_5)_2)_2$ tetraethyl-12-hydroxyl-dodecane-amino-di(methyl phosphonate)
$C_5H_9N(CH_2PO(OH)_2)_2$ 5-pentene-amino-di-(methyl phosphonic acid)
$C_4H_9N(C(C_6H_5)HP(O)(OH)_2)_2$ n-butyl-amino-di(benzylidene phosphonic acid)
$(OH)C_{12}H_{24}N(C(C_9H_{19})HP(O)(OH)_2)_2$ 12-hydroxy-dodecane-amino-di(nonyl methyl phosphonic acid)
$C_{12}H_{25}N[C(CH_3)_2PO(OH)_2][CH_2PO(OH)_2]$ dodecyl-amino(isopropylidene phosphonic acid)-(methyl phosphonic acid)
$C_{10}H_{21}N[C(C_6H_{11})HPO(OH)_2][CH_2PO(OH)_2]$ decyl-amino(cyclohexyl methyl phosphonic acid)(methyl phosphonic acid)
$C_{12}H_{25}N[C(C_{10}H_7)HPO(OH)_2][CH_2PO(OH)_2]$ dodecyl-amino (1-naphthyl methyl phosphonic acid)(methyl phosphonic acid)
$nC_4H_9N(CH_2P(O)(O_2Ca)_2)_2$ dicalcium-n-butyl-amino-di(methyl phosphonate)
$C_{12}H_{25}N[CH_2PO(ON(CH_3)_4)_4][CH_2PO(ON(CH_3)_4)(OH)]$ tri-tetramethyl ammonium-dodecyl-amino-di(methyl phosphonate)
$C_{12}H_{25}N[CH_2PO(O \cdot NH_3CH_2CH_2OH)_2][CH_2PO(O \cdot NH_3CH_2CH_2OH)(OH)]$ tri-ethanol ammonium-dodecyl-amino-di(methyl phosphonate)
$C_{14}H_{29}N[CH_2PO(ONH_4)_2][CH_2PO(ONH_4)(OH)]$ tri-ammonium tetradecyl-amino-di(methyl phosphonate)
$C_6H_{13}N(CH_2PO(OCH_2C_6H_5)_2)_2$ tetrabenzyl-n-hexyl-amino-di(methyl phosphonate)
$C_6H_{13}N(CH_2PO(OCH_2CH_2C_6H_5)_2)_2$ tetraphenylethyl-n-hexyl-amino-di(methyl phosphonate)

(2) Monocyclic, alicyclic-amino-di-alkylene phosphorus compounds, such as $C_4H_7N(CH_2PO(OH)_2)_2$ cyclobutyl-amino-di(methyl phosphonic acid)
$OHC_6H_{10}N(CH_2PO(OH)_2)_2$ 2-hydroxy-cyclohexyl-amino-di(methyl phosphonic acid)
$C_5H_9N(CH_2PO(OH)_2)_2$ cyclopentyl-amino-di(methyl phosphonic acid)
$C_5H_9N(C(CH_3)_2PO(OH)_2)_2$ cyclopentyl-amino-di(isopropylidene phosphonic acid)
$C_6H_{11}N(CH_2PO(OC_6H_5)_2)_2$ tetraphenyl-cyclohexyl-amino-di(methyl phosphonate)

(3) Monocyclic, aryl-amino-di-alkylene phosphorus compounds, such as $C_6H_5N(CH_2PO(OH)_2)_2$ phenyl-amino-di(methyl phosphonic acid)
$C_6H_5N[C(CH_3)_2PO(OH)_2][CH_2PO(OH)_2]$ phenyl-amino(isopropylidene phosphonic acid) (methyl phosphonic acid)
$(NO_2)_2C_6H_3N(CH_2PO(OH)_2)_2$ 2,4-dinitro-phenyl-amino-di(methyl phosphonic acid)
$COOH(C_6H_4)N(CH_2PO(OH)_2)_2$ 4-carboxy-phenyl-amino-di(methyl phosphonic acid)
$(Cl)_2(OH)C_6H_2N(CH_2PO(OH)_2)_2$ 3,5-dichloro-6-hydroxy-phenyl-amino-di(methyl phosphonic acid)
$(OH)C_6H_4N(CH_2PO(OH)_2)_2$ 4-hydroxy-phenyl-amino-di(methyl phosphonic acid)
$(NO_2)(OCH_3)C_6H_3N(CH_2PO(OH)_2)_2$ 3-nitro-4-methoxy-phenyl-amino-di(methyl phosphonic acid)
$C_6H_5N(CH_2PO(OC_6H_{11})_2)_2$ tetrahexyl-phenyl-amino-di(methyl phosphonate)

C₆H₅N(CH₂PO(OC₁₂H₂₃)₂)₂tetra-11-dodecene-phenyl-amino-di(methyl phosphonate)

(4) Dicyclic, aryl-amino-di-alkylene phosphorus compounds, such as

Cl(C₆H₄)(C₆H₄)N(CH₂PO(OH)₂)₂4'-chloro-4-N-diphenyl-amino-di(methyl phosphonic acid)
(OH)C₁₀H₆N(CH₂PO(OH)₂)₂4-hydroxy-naphthyl-1-amino-di(methyl phosphonic acid)
(OH)(SO₃H)C₁₀H₅N(CH₂PO(OH)₂)₂1-sulfo-3-hydroxy-naphthyl-1-amino-di(methyl phosphonic acid)

(5) Monocyclic, alkaryl-amino-di-alkylene phosphorus compounds, such as (CH₃)C₆H₄N(CH₂PO(OH)₂)₂p-methyl-phenyl-amino-di(methyl phosphonic acid)
(CH₃)₂C₆H₃N(CH₂PO(OH)₂)₂xylyl-amino-di(methyl phosphonic acid)
(CH₃)C₆H₄N(CH₂PO(OC₂H₅)₂)₂tetraethyl p-methyl-phenyl-amino-di(methyl phosphonate)
(CH₃)₂C₆H₃N(CH₂PO(ONa)₂)[CH₂PO(ONa)(OH)] trisodium xylyl-amino-di(methyl phosphonate)
C₁₂H(C₆H₄)N(CH₂PO(OH)₂)₂dodecyl-phenyl-amino-di(methyl phosphonic acid)
(CH₃)₄C₆HN(CH₂PO(OH)₂)₂durylene-amino-di(methyl phosphonic acid)

(6) Dicyclic, alkaryl - amino - di-alkylene phosphorus compounds, such as (CH₃)C₁₀H₇N(CH₂PO(OH)₂)₂5-methyl-naphthyl-2-amino-di(methyl phosphonic acid)
(CH₃)(OH)C₁₀H₆N(CH₂PO(OH)₂)₂2-methyl-1-hydroxy-4-naphthyl-amino-di(methyl phosphonic acid)
(C₁₂H)C₁₀H₆N(CH₂PO(OH)₂)₂7'-dodecyl-naphthyl-2-amino-di(methyl phosphonic acid)

(7) Monocyclic, aralkyl-amino-di-alkylene phosphorus compounds, such as

C₆H₅CH₂CH₂N(CH₂PO(OH)₂)₂phenylethyl-amino-di(methyl phosphonic acid)
C₆H₅CH₂CH₂CH₂N(CH₂PO(OH)₂)₂phenylpropyl-amino-di(methyl phosphonic acid)
C₆H₅CH₂N[C(C₅NH₄)HPO(OH)₂][CH₂PO(OH₂)] phenylmethyl-amino(2-pyridyl methyl phosphonic acid)(methyl phosphonic acid)
C₆H₅CH₂CH₂N(CH₂PO(O₂Ca)₂)dicalcium-phenyl-ethylamino-di(methyl phosphonate)

Quite unexpectedly organo-amino-di-alkylene phosphonic acids or the salts thereof were found to exhibit not only good deflocculating or dispersing properties but also good surfactancy properties. It is highly unusual for both of these properties to be effectively exhibited by the same compound. As can be appreciated, such compounds can advantageously be utilized in applications which can use the foregoing properties, such as, detergent compositions. In many detergent applications such as textile washing and hard surface cleaning, the ability of the detergent composition to remove the soil and keep the soil suspended in the washing medium is of paramount importance.

The long chain hydrocarbyl-amino-di-lower alkylene phosphonic acids or the salts thereof are preferred in applications such as detergent compositions which use the combined surfactancy and deflocculating properties. These compounds are of the following formula:

$$\begin{array}{c} YO \quad O \quad R_1 \quad R \quad R_3 \quad O \quad OY \\ \diagdown \parallel \quad | \quad | \quad | \quad \parallel \diagup \\ P-C-N-C-P \\ \diagup \quad | \quad | \quad | \quad \diagdown \\ YO \quad R_2 \quad R_4 \quad OY \end{array}$$

wherein:
R is selected from the class consisting of saturated and ethylenically unsaturated aliphatic hydrocarbyl radicals containing from 4 to 20 carbon atoms; $R_1$, $R_2$, $R_3$ and $R_4$ are selected from the class consisting of hydrogen and lower alkyl groups (1 to 4 carbon atoms); and Y is a cation. By the term "cation" is meant a hydrogen ion, alkali metal cation, alkaline earth metal cation, ammonium ion, or an amine ion.

As used in detergent compositions, the compounds of the instant invention are preferably formulated with other components, i.e., builders, anti-redeposition agents, brightening agents and the like, in amounts between about 10% to 50% by weight of the detergent composition.

As being illustrative of builders which can be used with the compounds of the instant invention are organic builder materials which include amino polycarboxylic acids, the amino tri(lower alkylidenephosphonic) acids, the alkylene diphosphonic acids, the water soluble salts of the foregoing acids and mixtures thereof.

Amino polycarboxylic acids are represented by the general structure $$\begin{array}{c} CH_2COOH \\ \diagup \\ N-CH_2COOH \\ \diagdown \\ R \end{array}$$

where R is a member selected from the group consisting of the radicals $$\begin{array}{c} -C-COOH \\ \diagup \quad \diagdown \\ R_1 \quad R_2 \end{array}$$

$$\begin{array}{c} -C-COOH \\ \diagup \quad \diagdown \\ H_2C \quad CH_2 \\ | \quad | \\ H_2C \quad CH_2 \\ \diagdown \diagup \\ C \\ H_2 \end{array}$$

$$\begin{array}{c} CH_2COOH \\ \diagup \\ -C_2H_4-N \\ \diagdown \\ CH_2COOH \end{array}$$

and $$\begin{array}{c} CO_2COOH \quad CH_2COOH \\ | \quad \diagup \\ -C_2H_4-N-C_2H_4-N \\ \diagdown \\ CH_2COOH \end{array}$$

wherein $R_1$ is a member selected from the group consisting of hydrogen, lower alkyl (1–4 carbon atoms), hydroxy substituted lower alkyl, phenyl and hydroxy substituted phenyl, and $R_2$ is a member selected from the group consisting of hydrogen, lower alkyl (1–4 carbon atoms, and hydroxy substituted lower alkyl.

Compounds illustrative of the amino polycarboxylic acids include nitrilo triacetic acid, ethylenediamine tetraacetic acid, diethylenetriamine penta-acetic acid, 1:2:diaminocyclohexane tetra-acetic acid, hydroxyethyl amino diacetic acid, hydroxyethyl ethylene diamine triacetic acid, orthohydroxyl phenyl ethylene diamine triacetic acid, anthanilic-N-N-diacetic acid, tris (hydroxymethyl) diethylene triamine diacetic acid, c-dibutyl-nitrilo triacetic acid and c-cyclohexenyl-nitrilo triacetic acid.

Amino tri (lower alkylidene phosphonic acids) are represented by the general structure $$N-\left(\begin{array}{c} X \quad O \quad OH \\ | \quad \parallel \diagup \\ C-P \\ | \quad \diagdown \\ Y \quad OH \end{array}\right)_3$$

where X and Y are members selected from the group consisting of hydrogen and lower alkyl groups (1–4 carbon atoms).

Compounds illustrative of amino tri(lower alkylidenephosphonic) acids include amino tri(methylenephosphonic acid), amino tri(ethylidenephosphonic acid), amino tri (isopropylidenephosphonic acid), amino tri(butylidenephosphonic acid), amino tri(propylidenephosphonic acid), amino tri(tert-amylidenephosphonic acid), amino tri (isoamylidenephosphonic acid) and amino tri(sec butylidenephosphonic acid).

Alkylene phosphonic acids are represented by general structure

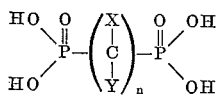

where X is a member selected from the group consisting of hydrogen and lower alkyl group (1–4 carbon atoms), Y is either hydrogen, hydroxyl, a halogen, especially chlorine, bromine and fluorine, or lower alkyl group (1–4 carbon atoms), and $n$ is an integer from 1 to 6.

Compounds illustrative of alkylene diphosphonic acids include methylenediphosphonic acid; ethylidenediphosphonic acid; 1 hydroxyl, ethylidenediphosphonic acid; hexamethylenediphosphonic acid; isopropylidenediphosphonic acid, butylidenediphosphonic acid; hydroxylmethylenediphosphonic acid; 1 hydroxyl, propylenediphosphonic acid; amylidenediphosphonic acid; pentamethylenediphosphonic acid; penta(propylidene)diphosphonic acid; tetra(1-hydroxyethylidene)diphosphonic acid.

It is to be understood that although the sodium salts of the amino tri(lower alkylidenephosphonic acids), alkylenediphosphonic acids, and aminopolycarboxylic acids are preferred, other water soluble salts such as potassium, lithium, and the like, as well as mixtures of the alkali metal salts may be substituted therefor. In addition, the ammonium salts, as well as amine salts, may be used to practice this invention.

Compounds illustrative of these salts include monopotassium nitrilotriacetate; pentasodium diethylenetriamine penta-acetate; diammonium ethylenediaminetetra-acetate; dimethylamino diethylenetriaminetetra-acetate; trilithium nitrilotriacetate; disodium diethylenetriamine penta-acetate; tripotassium ethylenediaminetetra-acetate; diethylamino nitrilotriacetate; pentapotassium diethylenetriamine pentaacetate; monosodium nitrilotriacetate; tetrasodium ethylenediaminetetra-acetate; disodium amino tri(methylphosphonate); dipotassium amino tri(methylphosphonate); diammonium amino tri(methylphosphonate); pentasodium amino tri(methylphosphonate); dilithium amino tri(ethylidenephosphonate); diammonium amino tri(ethylidenephosphonate); pentasodium amino tri(isopropylidenephosphonate); pentapotassium amino tri(butylidenephosphonate); diammonium amino tri(isopropylidenephosphonate); disodium amino tri(butylidenephosphonate); diethylamine amino tri(methylphosphoate); dimethylamine amino tri(ethylidenephosphonate); monolithium methylenediphosphonate; dipotassium methylenediphosphonate; diethylamine methylenediphosphonate; triammonium methylenediphosphonate; tetrasodium methylenediphosphonate; trisodium 1 hydroxy ethylidenediphosphonate; trisodium tri(2 hydroxy, 3 amylidene) diphosphonate; monopotassium ethylidenediphosphonate; dimethylamine ethylidenediphosphonate; tripotassium amylidenediphosphonate; tetrasodium butylidenediphosphonate; diammonium isopropylidenephosphonate; monosodium amylidenediphosphonate; and tripotassium ethylidenediphosphonate.

As being further illustrative of builders which can be used with the compounds of the instant invention are inorganic builder materials, usually comprised of inorganic phosphates, carbonates, sulfates, hydroxides, silicates or combinations thereof, and, in particular, the alkali metal salts of the foregoing materials. The alkali metal salts are preferably the potassium and sodium salts, although ammonium salts may be employed, particularly in combination with the potassium or sodium salts. The phosphate compounds are preferably the chain polyphosphates. Such polyphosphates contain more than 1 phosphorus atom per molecule, as distinguished from orthophosphates which contain only one phosphorus atom per molecule. Chain polyphosphates are non-cyclic (and usually linear) phosphates, as distinguished from ring or cyclic phosphates such as trimetaphosphates and tetrametaphosphates. Examples of the more common chain polyphosphates are tetrapotassium pyrophosphate, tetrasodium pyrophosphate, sodium tripolyphosphate, potassium hexametaphosphate and sodium hexametaphosphate.

Another builder material which is preferably utilized along with the chain polyphosphates are the water-soluble sodium and potassium silicates. As is well-known, sodium silicates can vary quite widely in composition, ranging from tetra and disilicates having a mole ratio of

of 1:4 and 1:2, respectively, to the more alkaline silicates, such as the orthosilicate having a mole ratio of $Na_2O:SiO_2$ of 2:1. In general, sodium silicate ($Na_2O:SiO_2=1:2$) is the preferred silicate compound for use according to the present invention. However, other silicates, or mixtures of silicates, having an overall mole ratio of $Na_2O:SiO_2$ between about 1:1 and 1:4 can be used. The carbonates, hydroxides and sulfates are preferably the sodium and potasssium carbonates, hydroxides and sulfates.

Ordinarily at least about 5 percent of the builder material by weight of the total composition can be used and usually not over about 90 percent with the preferred range being between about 30 and about 80 percent by weight. Additionally, minor amounts, usually less than about 2 percent by weight of the total composition, of additives, such as dyes, perfumes, anti-redeposition agents (sodium carboxymethyl cellulose) and the like can be incorporated into the composition.

Although the detergent compositions of this invention may comprise an organo-amino-di-alkylene phosphonic acid or salt thereof and the above-described builder materials and other additives, the compositions may also contain relatively minor amounts, usually less than 15% by weight, preferably 1 to 10% by weight, on a solids basis, other organic surface active agents such as foaming agents, emulsifiers, detergent surfactants or the like. Examples of organic surface active agents include anionic surfactants such as sulfated and sulfonated alkyl, aryl, and alkyl aryl hydrocarbons and alkali metal salts thereof, for example, sodium salts of long chain alkyl sulfates, sodium salts of alkyl naphthalene sulfonic acids, sodium salts of sulfonated abietenes, sodium salts of alkyl benzene sulfonic acids particularly those in which the alkyl group contains from 8–24 carbon atoms; sodium salts of sulfonated mineral oils and sodium salts of sulfosuccinic acid esters such as sodium dioctyl sulfosuccinate.

Advantageous anionic surfactants include the higher alkyl aryl sulfonic acids and their alkali metal and alkaline earth metal salts such as for example sodium dodecyl benzene sulfonate, sodium tridecyl benzene sulfonate, magnesium dodecyl benzene sulfonate, potassium tetradecyl benzene sulfonate, ammonium dodecyl toluene sulfonate, lithium pentadecyl benzene sulfonate, sodium dioctyl benzene sulfonate, disodium dodecyl benzene disulfonate, disodium di-isopropyl naphthalene disulfonate and the like as well as the alkali metal salts of fatty alcohol esters of sulfuric and sulfonic acids, the alkali metal salts of alkyl aryl (sulfothioic acid) ethers and the alkyl thiosulfuric acid, etc. Preferred anionic organic surface active agents are, as noted hereinbefore, sodium salts of alkyl benzene sulfonic acids and particularly preferred sodium salts of alkyl benzene sulfonic acids are those in which the alkyl group or radical contains 10 to 18 carbon atoms in a straight (i.e. unbranched) chain.

Examples of nonionic surfactants include products formed by condensing one or more alkylene oxides of 2 to 4 carbon atoms, such as ethylene oxide or propylene oxide, preferably ethylene oxide alone or with other alkylene oxides, with a relatively hydrophobic compound such as a fatty alcohol, fatty acid, sterol, a fatty glyceride, a fatty amine, an aryl amine, a fatty mercaptan, tall oil, etc. Nonionic surface active agents also include those products produced by condensing one or more relatively lower alkyl alcohol amines (such as methanolamine, ethanolamine, propanolamine, etc.) with a fatty acid such as lauric acid, cetyl acid, tall oil fatty acid, abietic acid, etc. to produce the corresponding amide.

Particularly advantageous nonionic surface active agents are condensation products of a hydrophobic compound having at least 1 active hydrogen atom and a lower alkylene oxide (for example the condensation product of an aliphatic alcohol containing from about 8 to about 18 carbon atoms) and from about 3 to about 30 mols of ethylene oxide per mol of the alcohol, or the condensation product of an alkyl phenol containing from about 8 to about 18 carbon atoms in the alkyl group and from about 3 to about 30 mols of ethylene oxide per mol of alkyl phenol. Other advantageous nonionic detergents include condensation products of ethylene oxide with a hydrophobic compound formed by condensing propylene oxide with propylene glycol.

Other typical examples of these categories of the anionic and nonanionic surface active agents are described in Schwartz and Perry, "Surface Active Agents," Interscience Publishers, New York (1949), and the Journal of American Oil Chemists Society, volume 34, No. 4, pages 170–216 (April 1957).

The detergent composition of the present invention is not ot be limited to any particular method of mixing the ingredients used in the composition. The organo-amino-dialkylene phosphonic acids or salts may be mechanically mixed in, crutched in the detergent composition in the form of a slurry, or dissolved in a solution of the detergent composition. In addition, the organo-amino-di-alkylene phosphonic acids or salts may be admixed with other ingredients in any of the forms in which the detergent composition is manufactured in, as well as being added simultaneously or separately to an aqueous solution. In any event, the organo-amino-dialkylene phosphonic acids or salts are intended to be used with the other ingredients at the time of application as a cleansing agent.

Compounds illustrative of the invention were tested for surfactancy properties by determining surface tension measurements with a du Nuoy Tensiometer in distilled water at room temperature. The compounds tested were at concentrations believed representative of detergent concentrations used in actual applications. The results of the test are tabulated below.

TABLE 1

| Compound | Surface Tension (dyne/cm.) at indicated molar concentrations | |
|---|---|---|
| | $5 \times 10^{-4}$ | $10^{-3}$ |
| (1) Trisodium methyl-amino-dimethylphosphonate $CH_3N(CH_2PO(ONa)_2)(CH_2PO(ONa)(OH))$ | 72 | 60 |
| (2) Trisodium hexyl-amino-dimethylphosphonate $C_6H_{13}N(CH_2PO(ONa)_2)(CH_2PO(ONa)(OH))$ | 62 | 64 |
| (3) Trisodium cyclo-hexyl-amino-dimethylphosphonate $(C_6H_{12})N(CH_2PO(ONa)_2)(CH_2PO(ONa)(OH))$ | 61 | 61 |
| (4) Trisodium octyl-amino-dimethylphosphonate $C_8H_{17}N(CH_2PO(ONa)_2)(CH_2O(ONa)(OH))$ | 56 | 44 |
| (5) Trisodium decyl-amino-dimethylphosphonate $C_{10}H_{21}N(CH_2PO(ONa)_2)(CH_2O(ONa)(OH))$ | 44 | 40 |
| (6) Trisodium dodecyl-amino-dimethylphosphonate $C_{12}H_{25}N(CH_2PO(ONa)_2)(CH_2PO(ONa)(OH))$ | 44 | 39 |
| (7) Trisodium tetradecyl-amino-dimethylphosphonate $C_{14}H_{29}N(CH_2PO(ONa)_2)(CH_2PO(ONa)(OH))$ | 44 | 38 |
| (8) Trisodium hexadecyl-amino-dimethylphosphonate $C_{16}H_{33}N(CH_2PO(ONa)_2)(CH_2PO(ONa)(OH))$ | 36 | 34 |
| (9) Trisodium oleyl-amino-dimethylphosphonate $C_{18}H_{35}N(CH_2PO(ONa)_2)(CH_2PO(ONa)(OH))$ | 44 | 44 |
| (10) Water | 72 | 72 |
| (11) Sodium dodecylbenzene sulfonate | 35 | 37 |

As can be observed from the above table compounds illustrative of the invention, i.e., (2), (3), (4), (5), (6), (7), (8), and (9) all exhibit the ability to lower the surface tension of water (10). Compounds (5), (6), (7), and (8) all compared very favorably with sodium dodecylbenzene sulfonate (11) a widely used surfactant. It should be noted that compound (1) exhibited no appreciable ability to lower the surface tension of water. As can be appreciated, therefore, by reason of their surfactancy compounds of this invention are particularly well suited for use in detergent compositions.

Compounds illustrative of the invention were tested for deflocculating properties in a carefully controlled kaolin slurry. The kaolin used in the evaluation was essentially free of impurities and was placed in an aqueous slurry with a solids content of about 68%. The slurry throughout the evaluation was maintained at a pH of about 7 with NaOH. The apparent viscosity was determined with a Stormer viscometer at 300 r.p.m. The results of the tests are tabulated below.

TABLE 2

| Compound | Apparent Viscosity (cp.) at 300 r.p.m. Stormer at indicated weight percent of deflocculation on a dry clay basis | | | |
|---|---|---|---|---|
| | 0 | .1 | .15 | .2 |
| (1) Trisodium methyl amino-dimethylphosphonate $CH_3N[CH_2PO(ONa)_2][CH_2PO(ONa)(OH)]$ | Plastic | 180 | 180 | 180 |
| (2) Trisodium butyl amino-dimethylphosphonate $C_4H_9N[CH_2PO(ONa)_2][CH_2PO(ONa)(OH)]$ | do | 220 | 210 | 200 |
| (3) Trisodium cyclohexylamino-dimethylphosphate $(C_6H_{13})N[CH_2PO(ONa)_2][CH_2PO(ONa)(OH)]$ | do | 220 | 210 | 200 |
| (4) Trisodium octyl-amino-dimethylphosphonate $C_8H_{17}N[CH_2PO(ONa)_2][CH_2PO(ONa)(OH)]$ | do | 180 | 180 | 200 |
| (5) Trisodium tetradecyl-amino-dimethylphosphonate $C_{14}H_{29}N[CH_2PO(ONa)_2][CH_2PO(ONa)(OH)]$ | do | 380 | 370 | 390 |
| (6) Trisodium oleyl amino-dimethylphosphonate $C_{18}H_{35}N[CH_2PO(ONa)_2][CH_2PO(ONa)(OH)]$ | do | 1,400 | 1,000 | 1,100 |
| (7) Sodium tripolyphosphate | do | 180 | 180 | 180 |

As can be observed from the above table, minor amounts of the compounds illustrative of the invention, i.e., (2), (3), (4), (5) and (6), deflocculated a plastic slurry into a flowable slurry. In addition, compounds (2), (3) and (4) compared very favorably with sodium tripolyphosphate (7), a widely used deflocculant, and compound (1).

The following detergent formulations in which the percentages are by weight are presented as being illustrative of the present invention:

(I)

| | Percent |
|---|---|
| Tetrasodium dodecyl - amino - di(methylphosphonate) | 20 |
| Sodium tripolyphosphate | 50 |
| Sodium carboxymethyl cellulose | 1 |
| Sodium silicate | 10 |
| Sodium sulfate | 19 |

(II)

| | |
|---|---|
| Tetrasodium dodecyl - amino - di(methylphosphonate) | 20 |
| Trisodium 1-hydroxy, ethylidene diphosphonate | 30 |
| Sodium carboxymethyl cellulose | 1 |
| Sodium silicate | 10 |
| Sodium sulfate | 19 |
| Sodium tripolyphosphate | 20 |

(III)

| | |
|---|---|
| Trisodium tetradecyl - amino - di(methylphosphonate) | 20 |
| Trisodium nitrilo triacetate | 30 |
| Sodium silicate | 10 |
| Sodium carbonate | 40 |

(IV)

| | |
|---|---|
| Tetrapotassium decyl - amino - di(methylphosphonate) | 5 |
| Tetrasodium tetradecyl - amino - di(methylphosphonate) | 5 |
| Sodium dodecyl benzene sulfonate | 10 |
| Pentasodium amino tri(methylphosphonate) | 30 |
| Sodium carboxymethyl cellulose | 1 |
| Sodium sulfate | 49 |

(V)

| | |
|---|---|
| Tetrasodium tetradecyl - amino - di(methylphosphonate) | 20 |
| Nonionic condensate (dodecyl alcohol·ethylene oxide on a 1:10 molar ratio basis) | 10 |
| Tetrapotassium pyrophosphate | 30 |
| Sodium silicate | 39 |
| Sodium carboxymethyl cellulose | 1 |

All of the foregoing detergent formulations are effective for cleaning textiles, hard surfaces such as dishes, walls and the like when used in concentrations of about 0.2% in water.

The esters of organo-amino-di-alkylene phosphonic acids were found not only to be completely miscible with water but also highly soluble in organic solvents, such as hydrocarbon solvent, i.e., hexane and pentane, carbon tetra chloride, haloethylene solvents, i.e., perchloroethylene, ethers, alcohols, and the like. Also, the esters were found to impart a solubilizing action to water in water-immiscible solvents such as many of the previously mentioned solvents. This totally unexpected property renders them highly useful as gasoline de-icer additives and along with their surfactancy properties render them useful as dry cleaning detergents. As can be appreciated, however, the unique ability to impart a solubilizing action to water in water-immiscible solvents can be utilized in many and varied applications and therefore, the foregoing mentioned applications are merely indicative of their use.

The esters of long chain hydrocarbyl-amino-di-lower alkylene phosphonic acids are preferred in applications which use the combined surfactancy and/or water solubilizing properties. These compounds are of the following formula:

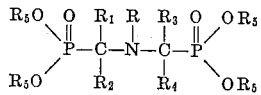

wherein:

R is selected from the class consisting of saturated and ethylenically unsaturated aliphatic hydrocarbyl radicals containing from 4 to 20 carbon atoms; $R_1$, $R_2$, $R_3$ and $R_4$ are selected from the group consisting of hydrogen and lower alkyl groups (1 to 4 carbon atoms); and $R_5$ is selected from the class consisting of alkyl groups of from 1 to 20 carbon atoms, aryl groups and alkylaryl groups.

Because of the complexity of the ternary solubility diagram of the esters of the instant invention—water—water-immiscible solvents, the following is set forth for exemplary purposes only.

(A) A solution of equal volumes of tetraethyl tetradecylamino-di-methylphosphonate, $$C_{12}H_{25}N(CH_2PO(OC_2H_5)_2)_2$$

and water were found to completely dissolve one volume of hexane.

(B) A solution of equal volumes of tetraethyl iso-butyl amino-di-methylphosphonate, $$\text{iso-}C_4H_9N(CH_2PO(OC_2H_5)_2)_2$$

and water were found to completely dissolve one-half a volume of hexane.

(C) A solution of 50 cc. of hexane and 3 grams of the following esters of the long chain alkyl-amino-di-methylphosphonic acids dissolved the amounts of water at room temperature indicated in Table 3. The water was added dropwise until permanent cloudiness or phase separation was observed. The tabulated results are presented in the following table.

TABLE 3

| Compound: | H$_2$O added (grams) |
|---|---|
| (1) tetraethyl hexadecylamino-di-methylphosphonate $C_{16}H_{33}N(CH_2PO(OC_2H_5)_2)_2$ | 3 |
| (2) tetraethyl tetradecyl amino-di-methylphosphonate $C_{12}H_{25}N(CH_2PO(OC_2H_5)_2)_2$ | 1 |
| (3) tetraethyl, octylamino-di-methylphosphonate $C_8H_{17}N(CH_2PO(OC_2H_5)_2)_2$ | .7 |
| (4) tetraethyl iso-butyl amino-di-methylphosphonate iso-$C_4H_9N(CH_2PO(OC_2H_5)_2)_2$, several drops. | |

It should be noted that the foregoing example solutions exhibited no phase separation at the end of a one-week period of standing nor was there a phase separation after the solutions had been centrifuged at 5,000 r.p.m. for one hour indicating that the water was completely dissolved in the water-immiscible solvent. It should further be noted that tetraethyl methyl amino-di-methylphosphonate,

did not impart a solubilizing action to water in a water-immiscible solvent.

As previously mentioned the ester compounds of the instant invention are useful in gasoline de-icer additives and are preferably used in amounts of from .005 to .1% by weight. An advantageous feature of these de-icer additives, by reason of their phosphorus content, is their ability to function either wholly as the primary additive for surface ignition control or in conjunction with other known phosphorus additives for surface ignition control.

As dry cleaning additives the ester compounds of the instant invention can be used as either the primary surfactant or in conjunction with other surfactants. When used as substantially the primary surfactant with many of the common organic solvents, such as, Stoddard's solvent (petroleum distillate) and perchloroethylene, amounts within the range of .05% to 4% by weight are usually sufficient with amounts of from about 1 to 2% by weight being preferred.

We claim:

1. A detergent composition consisting essentially of at least about 5% by weight of said composition of a material selected from the group consisting of water soluble inorganic alkaline builders, water soluble organic sequestering builders, and mixtures thereof and at least about 10% by weight of said composition of an organo-amino-di-alkylene phosphorus compound having the formula

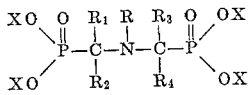

wherein R is selected from a class consisting of aliphatic hydrocarbyl groups containing from 4 to 30 carbon atoms, alicyclic groups containing from 4 to 6 carbon atoms, aryl groups containing from 6 to 10 carbon atoms, alkaryl groups containing from 7 to 30 carbon atoms and aralkyl groups containing from 7 to 30 carbon atoms; $R_1$, $R_2$, $R_3$ and $R_4$ are selected from the class consisting of hydrogen, aliphatic hydrocarbyl groups containing from 1 to 30 carbon atoms, alicyclic groups containing from 4 to 6 carbon atoms, aryl groups containing from 6 to 10 carbon atoms, alkaryl groups containing from 7 to 30 carbon atoms and aralkyl groups containing from 7 to 30 carbon atoms; and X is selected from the group consisting of hydrogen, alkali metal, alkaline earth metal, ammonium and lower molecular weight alkyl, alkylene and alkanol amines.

2. The detergent composition of claim 1, wherein said compound is present in amounts of from about 10% to 50% by weight of said composition.

3. The detergent composition of claim 2 containing builder materials in amounts of from about 5% to 90% by weight of said composition.

4. The detergent composition of claim 3 containing organic surface active agents selected from the group consisting of anionic surfactants and nonionic surfactants in amounts less than about 15% by weight of said composition.

5. A detergent composition comprising from about 5 to about 90% by weight of said composition of a material selected from the group consisting of water soluble inorganic builders, water soluble organic sequestering builders, and mixtures thereof and from about 10 to about 50% by weight of said composition of a long-chain hydrocarbyl-amino-di-lower alkylene phosphorus compound having the formula

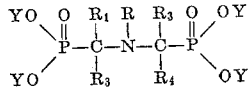

wherein R is selected from the class consisting of saturated and ethylenically unsaturated aliphatic hydrocarbyl radicals containing from 4 to 20 carbon atoms; $R_1$, $R_2$, $R_3$ and $R_4$ have the structure $C_xH_{2x+1}$ wherein $x$ is an integer from 0 to 4 inclusive; and Y is selected from the group consisting of hydrogen, alkali metal, alkaline earth metal, ammonium and lower molecular weight alkyl, alkylene and alkanol amines.

6. The detergent composition of claim 5 containing builder materials in amounts of from about 30% to 80% by weight of said composition.

7. The detergent composition of claim 6 containing organic surface active agent selected from the group consisting of anionic surfactants and nonionic surfactants in amounts less than about 15% by weight of said composition.

8. A detergent composition comprising from about 5 to about 90% of a material selected from the group consisting of water soluble inorganic alkaline builders, water soluble organic sequestering builders and mixtures thereof and from about 10 to about 50% by weight of said composition of a long-chain hydrocarbyl-amino-di(methyl phosphonate) having the formula

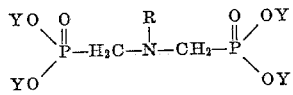

wherein R is selected from the class consisting of saturated and ethylenically unsaturated aliphatic hydrocarbyl radicals containing from 4 to 20 carbon atoms and Y is selected from the group consisting of hydrogen, alkali metal, alkaline earth metal, ammonium and lower molecular weight alkyl, alkylene and alkanol amines.

9. The detergent composition of claim 8 containing builder materials in amounts of from about 30% to 80% by weight of said composition.

10. The detergent composition of claim 9 containing organic surface active agents selected from the group consisting of anionic surfactants and nonionic surfactants in amounts less than about 15% by weight of said composition.

11. The detergent composition of claim 8, wherein said compound is a sodium salt of decyl-amino-di(methyl phosphonate).

12. The detergent composition of claim 8, wherein said compound is a sodium salt of dodecyl-amino-di(methyl phosphonate).

13. The detergent composition of claim 8, wherein said compound is a sodium salt of tetradecyl-amino-di(methyl phosphonate).

No references cited.

LEON D. ROSDOL, *Primary Examiner.*

J. T. FEDIGAN, *Assistant Examiner.*